(12) United States Patent
Patterson et al.

(10) Patent No.: US 6,784,230 B1
(45) Date of Patent: Aug. 31, 2004

(54) CHLORINATED VINYL RESIN/CELLULOSIC BLENDS: COMPOSITIONS, PROCESSES, COMPOSITES, AND ARTICLES THEREFROM

(75) Inventors: John Robert Patterson, Philadelphia, PA (US); Scott Warren Reading, Burlington, NJ (US); Eugene Patrick Dougherty, Langhorne, PA (US)

(73) Assignee: Rohm and Haas Company, Philadelphia, PA (US)

( * ) Notice: Subject to any disclaimer, the term of this patent is extended or adjusted under 35 U.S.C. 154(b) by 227 days.

(21) Appl. No.: 09/661,816

(22) Filed: Sep. 14, 2000

Related U.S. Application Data

(60) Provisional application No. 60/155,718, filed on Sep. 23, 1999.

(51) Int. Cl.$^7$ .......................... C08L 13/02; C08L 27/04
(52) U.S. Cl. .......................... 524/13; 524/16; 524/567; 524/569
(58) Field of Search .......................... 524/13, 16, 567; 524/569; 428/338, 339

(56) References Cited

U.S. PATENT DOCUMENTS

| | | |
|---|---|---|
| 2,935,763 A | 5/1960 | Newman et al. |
| 3,161,560 A | 12/1964 | Paquin et al. |
| 3,309,438 A | 3/1967 | Bergstein et al. |
| 3,619,344 A | 11/1971 | Wolinski et al. |
| 4,003,866 A | 1/1977 | Paturle |
| 4,051,280 A | 9/1977 | Mellows |
| 4,102,720 A | 7/1978 | Kaneko et al. |
| 4,150,077 A | 4/1979 | Slocumb |
| 4,168,251 A | 9/1979 | Schnizel et al. |
| 4,737,532 A | 4/1988 | Fujita et al. |
| 5,406,768 A | 4/1995 | Giuseppe et al. |
| 5,439,749 A | 8/1995 | Klasell et al. |
| 5,441,801 A | 8/1995 | Deaner et al. |
| 5,486,553 A | 1/1996 | Deaner et al. |
| 5,497,594 A | 3/1996 | Giuseppe et al. |
| 5,516,472 A | 5/1996 | Laver |
| 5,518,677 A | 5/1996 | Deaner et al. |
| 5,539,027 A | 7/1996 | Deaner et al. |
| 5,585,155 A | 12/1996 | Heikkila et al. |
| 5,695,874 A | 12/1997 | Deaner et al. |
| 5,700,555 A | 12/1997 | Grill |
| 5,725,939 A | 3/1998 | Nishibori |
| 5,738,935 A | 4/1998 | Turk et al. |
| 5,746,958 A | 5/1998 | Gustafsson et al. |
| 5,759,680 A | 6/1998 | Brooks et al. |
| 5,773,138 A | 6/1998 | Seethamraju et al. |
| 5,827,462 A | 10/1998 | Brandt et al. |
| 5,827,607 A | 10/1998 | Deaner et al. |
| 5,847,016 A | 12/1998 | Cope |
| 5,854,295 A | 12/1998 | Suh et al. |
| 5,858,522 A | 1/1999 | Turk et al. |
| 5,866,264 A | 2/1999 | Zehner et al. |
| 5,866,641 A | 2/1999 | Ronden et al. |
| 5,869,138 A | 2/1999 | Nishibori |
| 5,882,564 A | 3/1999 | Puppin |
| 5,932,334 A | 8/1999 | Deaner et al. |
| 5,973,035 A | 10/1999 | Medoff et al. |
| 5,981,067 A | 11/1999 | Seethamraju et al. |
| 5,985,429 A | 11/1999 | Plummer et al. |
| 5,997,784 A | 12/1999 | Karnoski |
| 6,004,668 A | 12/1999 | Deaner et al. |
| 6,007,656 A | 12/1999 | Heikkila et al. |
| 6,015,611 A | 1/2000 | Deaner et al. |
| 6,015,612 A | 1/2000 | Deaner et al. |
| 6,054,207 A | 4/2000 | Finley |
| 6,083,601 A | 7/2000 | Prince et al. |
| 6,122,877 A | 9/2000 | Hendrickson et al. |
| 6,253,527 B1 | 7/2001 | De Zen |

FOREIGN PATENT DOCUMENTS

| | | |
|---|---|---|
| AU | 83-17916 | 8/1983 |
| EP | 284058 A2 | 9/1988 |
| EP | 747419 A2 | 12/1996 |
| EP | 807510 A1 | 11/1997 |
| EP | 0 807 510 A1 * | 11/1997 |
| FR | 2514773 | 4/1983 |
| WO | WO 99/51425 | 10/1999 |

OTHER PUBLICATIONS

Search Report, European Patent Office for EP Patent Application No. 307762.5–2109, Feb. 5, 2001.
Schut, Jan H., "Wood is Good for Compounding, Sheet & Profile", Plastics Technology Online, Mar. 1999, www.plasticstechnology.com/articles/199903fal.html.
Bhadauria, C.S., et al., "Development of PVC/Woodflour Composites . . . ", Popular Plastics Annual, pp. 87–89, 1978.
JP Patent Application Translation, Pat. App. No. Sho 57–52457, Oct. 5, 1983.
JP Patent Application Translation, Pat. App. No. Sho 59–50276, Oct. 3, 1985.
JP Patent Application Translation, Pat. App. No. Sho 58–168429, Apr. 6, 1985.
English, Brent, "Wood–Plastic Materials and Processes: A Look at Twenty Five Years of Patent Activity", English Engineering and Consulting, pp. 60–72, Dec. 5, 2000.
JP Patent Application Translation, Patent Application Translation, Pat. App. No. Hei 7–315193 (95–315193), Jun. 17, 1997.

(List continued on next page.)

*Primary Examiner*—Robert D. Harlan
(74) *Attorney, Agent, or Firm*—Marcella M. Bodner; Jeffrey H. Rosedale

(57) ABSTRACT

Compositions and processes for preparing extrudable powder blends containing at least one vinyl chloride resin and a cellulosic material are provided. More specifically, compositions and processes for preparing extrudable free-flowing powder blends containing PVC and wood flour (WF) are also provided for preparing foamed or nonfoamed extrudates. The processes provided herein incorporate components which may contain up to a total of 25 weight percent water. Processes for preparing foamed extrudates are also provided wherein a cooling fluid is used to increase the expansion ratio of the foam. Finally provided are composites having an extrudable thermoplastic substrate and at least one capstock layer disposed thereon containing a PVC/WF composition.

11 Claims, No Drawings

OTHER PUBLICATIONS

JP Patent Application Translation, Pat. App. No. Sho 60–226348, Apr. 20, 1987.

Matuana, L. M., et al., "Cell Morphology and Property Relationships of Microcellular Foamed PVC/Wood–Fiber Composites", Poly. Eng. And Sci., vol. 38, No. 11, 1862–1872, Nov. 1998.

Matuana, L. M., et al., "Processing and Cell Morphology Relationships for Microcellular Foamed PVC/Wood–Fiber Composites", Poly. Eng. And Sci., vol. 37, No. 7, 1137–1147, Jul. 1997.

Matuana–Malanda, L., et al., "Production of Microcellular Foamed PVC/Wood–Fibre Composites . . . ", Ann. Tech. Conf.–Soc. Plast. Eng., (ANTEC) 1900–1907 (1996).

Rogalski, M. E., et al., "Poly(Vinyl–Chloride) Wood Fiber Composites", ANTEC—Soc. Plast. Eng., pp 1436–1440, 1987.

Kokta, B.V., et al., "Composites of Polyvinyl Chloride–Wood Fiberts . . . ", J. Vinyl Tech., vol. 12, No. 3, pp. 146–153, Sep. 1990.

Mantuana, L. M., et al., "Influence of Interfacial Interactions on the Properties of PVC/Cellulosic Fiber Composites", Annu. Tech. Conf.–Soc. Plast. Eng., $56^{th}$ (vol. 3), 3313–3318 (1998).

* cited by examiner

CHLORINATED VINYL RESIN/CELLULOSIC BLENDS: COMPOSITIONS, PROCESSES, COMPOSITES, AND ARTICLES THEREFROM

This application claims the benefit of Provisional application Ser. No. 60/155,718 filed Sep. 23, 1999.

BACKGROUND

The present invention relates to compositions containing a blend of chlorinated vinyl resins (such as polyvinyl chloride) and cellulosic materials (such as wood flour) which have excellent melt flow and melt strength for forming foamed and unfoamed extrudates having a high quality appearance. More specifically, the present invention relates to particular compositions of chlorinated vinyl resins, thermal stabilizers, lubricants, high molecular weight ("MW") polymer processing aids, and a relatively high amount (greater than about 24 weight percent total) of cellulosic materials which form free flowing powders. Such compositions are readily extruded and can be formed into various foamed and unfoamed composite articles used in various applications, including building and construction products, such as fencing, siding, decking, window frames, sills, and doors. The present invention also relates to processes for preparing powder mixtures of such blend compositions which are readily extruded and thereby overcome the problems of pre-drying or pelletization as currently practiced. The present invention relates to a process for preparing free-flowing powders wherein up to 25 weight percent of the total added components can initially be water. The present invention also relates to a process for preparing foamed extrudates having an increased expansion ratio. Furthermore, the present invention relates to composites containing the compositions of the present invention.

Typically when high weight percentages of wood flour are blended with PVC, the resulting compound exhibits a high moisture content, poor powder handling properties (poor powder flow and low bulk density), poor melt flow and melt strength, and the finished part has a rough surface with edge tearing. Until now, previous attempts at combining wood flour and PVC have been limited to about a 20 percent weight percentage of the final composition as wood flour. Above 20 percent wood flour these problems are magnified and extrusion can not be readily performed.

Others have overcome these problems by pre-drying the wood flour ("WF") before combining with PVC in preparing powder blends, predrying the powder blend before extrusion, or by first forming the PVC/WF powder blend into pellets. Such practices are both costly and time-consuming.

In U.S. Pat. No. 5,847,016, Cope describes a two step process for preparing PVC and wood flour composites wherein the wood flour particles are encapsulated by the PVC and pelletized. The pellets are subsequently mixed with additional PVC resin and blowing agent and extruded into a finished product. The encapsulation is believed to prevent moisture absorption in the pellets which affects the ability to extrude PVC/WF composites into foam. The total weight percent of wood flour in the disclosed PVC/WF compositions is limited to only about 17%.

In Japanese patent publication JP 95-315193, Murakami et al. describe foamable vinyl chloride resin/wood flour compositions in which the compositional components are formed into pellets and subsequently extruded or molded into parts. Murakami's compositions have total amounts of lubricants and processing aids which are fixed relative to that of the PVC amounts. As a result, the weight percentages of total lubricants and processing aids were decreased as the amount of wood flour was increased. As demonstrated herein, such compositions are not readily extrudable directly into smooth extrudates when in a powder form.

Similarly, it is known to simply add WF to a typical PVC formulation. This results in the total weight percentages of several key components (lubricants, high MW polymer processing aids and blowing agent) being considerably reduced as the amount of WF is increased. When this occurs, we have observed that process performance is greatly reduced.

We have heretofore discovered that in order to provide powder blends of a chlorinated vinyl resin (e.g., PVC) and a cellulosic material (e.g., WF) which are readily processable into foam extrudates having good appearance, it is important to maintain the weight percentages of the total lubricants and total high MW polymer processing aids based on the total blend composition at a level commensurate with that of a standard PVC foam formulation not containing WF. Therefore, as the amounts of cellulosic materials are increased, a concomitant increase in total lubricants and processing aids is required. The compositions and the process for preparing these powder compositions described herein contain a high weight percentage of cellulosic materials (hereinafter ("CM"), greater than or equal to 24 percent by weight and at least one chlorinated vinyl resin (hereinafter "CVR"). These compositions not only are directly extrudable (and therefore do not require first pelletization of the composition or pre-drying of the cellulosic material component), but also provide extrudates having a good appearance. Until now, such compositions and processes have been heretofore unknown.

One object of the present invention is to provide extrudable chlorinated vinyl resin/cellulosic blend powder compositions that are readily extrudable into foamed and non-foamed articles. A second object of the present invention is to provide extrudable polyvinyl chloride/wood flour blend powder compositions that are also free flowing powders which are readily extrudable into foamed and nonfoamed articles. A third object of the present invention is to provide a in process for preparing the powder compositions according to the first object of the present invention. A fourth object of the present invention is to provide a process for preparing the powder blend composition according to the second object of the present invention wherein up to 25 weight percent of the total components added to the process can be water that is subsequently removed. A fifth object of the present invention is to provide a process for preparing a foamed extrudate having an increased expansion ratio. A sixth object of the present invention is to provide a composite having a substrate layer and at least one capstock layer made from the extrudable polyvinyl chloride/wood flour blend powder compositions according to the second object of the present invention. These and other objects as will become apparent from the following disclosure are achieved by the present invention.

SUMMARY OF THE INVENTION

In the present invention, the problem of providing an extrudable chlorinated vinyl resin/cellulosic material (hereinafter "CVR/CM") powder composition containing greater than or equal to 24 weight percent of a cellulosic material is solved generally by ensuring that the total weight fractions of lubricants and high MW polymer processing aids does not decrease as the amount of cellulosic material is added to the composition. Specifically, the present invention provides that total weight percentage of total lubricants in the powder compositions remains between about 1.5 and 5 percent, and the total weight percentage of high MW polymer processing aids remains between about 3.5 and 15 percent as the total weight percentage of cellulosic material is varied between 24 and 65 percent. Additionally, the present invention provides a process for preparing extrudable chlorinated vinyl resin/cellulosic blend powder compositions which are free-flowing powders that are readily extrudable into foamed and nonfoamed articles. The present invention also provides a process for preparing such powder blends including one ore more blowing agents for foamed extrudates, wherein an excess of up to 25 weight percent water may be provided during the addition of the blend components which is otherwise deleterious to the proper functioning of the blowing agents. The present invention also provides a process for preparing a foamed extrudate wherein the surface of the expanding extrudates are hardened with a cooling fluid to increase the expansion ratio of the foamed extrudate. The present invention also provides a composite comprising a substrate layer comprising an extrudable thermoplastic resin, and at least one capstock layer disposed thereon comprising the extrudable free-flowing powder blend compositions of the present invention.

Thus, in a first aspect of the present invention is provided an extrudable chlorinated vinyl resin/cellulosic powder blend composition including:
  (a) from 30 to 65 weight percent of at least one chlorinated vinyl resin;
  (b) from 0.25 to 5 weight percent of at least one thermal stabilizer;
  (c) from 1.5 to 5 weight percent of at least one lubricant;
  (d) from 3.5 to 15 weight percent of at least one high molecular weight polymer processing aid; and
  (e) from 24 to 65 weight percent of at least one cellulosic material.

In a second aspect of the present invention, there is provided an extrudable free-flowing powder blend composition including:
  (a) from 40 to 55 weight percent of at least one PVC resin;
  (b) from 0.5 to 1.5 weight percent of at least one thermal stabilizer;
  (c) from 1.5 to 3 weight percent of at least one lubricant;
  (d) from 5 to 10 weight percent of at least one high molecular weight polymer processing aid;
  (e) from 34 to 52 weight percent of at least one wood flour;
  (f) from 3 to 15 weight percent of at least one mineral filler; and
  (g) up to 3 weight percent of at least one blowing agent.

In a third aspect of the present invention, there is provided a process for preparing an extrudable powder blend including the steps of:
  (I) blending a mixture including the following components:
    (a) from 30 to 65 weight percent of at least one chlorinated vinyl resin;
    (b) from 0.25 to 5 weight percent of at least one thermal stabilizer;
    (c) from 1.5 to 5 weight percent of at least one lubricant;
    (d) from 3.5 to 15 weight percent of at least one high molecular weight polymer processing aid; and
    (e) from 24 to 65 weight percent of at least one cellulosic material containing moisture;
  (II) raising the temperature above 50° C. during the (I) blending step; and
  (III) removing water vapor.

In a fourth aspect of the present invention, there is provided a process for preparing an extrudable free-flowing powder blend including the steps of:
  (I) blending a mixture including the following components:
    (a) from 40 to 55 weight percent of at least one PVC resin;
    (b) from 0.5 to 1.5 weight percent of at least one thermal stabilizer;
    (c) from 1.5 to 3 weight percent of at least one lubricant;
    (d) from 5 to 10 weight percent of at least one high molecular weight polymer processing aid;
    (e) from 34 to 52 weight percent of at least one wood flour containing moisture;
    (f) from 3 to 15 weight percent of at least one mineral filler; and
    (g) up to 3 weight percent of at least one blowing agent;
  (II) raising the temperature above 80° C. during the (I) blending step; and
  (III) removing water vapor so that the final moisture amount in of the powder blend is below 2.0 weight percent.

In a fifth aspect of the present invention, there is provided a process for preparing a foamed extrudate including the steps of:
  (I) feeding an extrudable free-flowing powder blend comprising at least one blowing agent into an extruder;
  (II) melting the powder blend to form a melt;
  (III) extruding the melt from a die to form an expanding extrudate having at least one surface;
  (IV) hardening the surface of the expanding extrudate with a cooling fluid to increase the expansion ratio of the foamed extrudate.

In a sixth aspect of the present invention there is provided a composite including a substrate layer including an extrudable thermoplastic resin, and at least one capstock layer disposed thereon including an extrudable free-flowing powder blend composition including:
  (a) from 40 to 55 weight percent of at least one PVC resin;
  (b) from 0.5 to 1.5 weight percent of at least one thermal stabilizer;
  (c) from 1.5 to 3 weight percent of at least one lubricant;
  (d) from 5 to 10 weight percent of at least one high molecular weight polymer processing aid;
  (e) from 34 to 52 weight percent of at least one wood flour;
  (f) from 3 to 15 weight percent of at least one mineral filler; and
  (g) up to 3 weight percent of at least one blowing agent.

In another aspect of the invention there are provided extrudates, molded parts, sheet, films, pipes, foams, containers, profiles, or other articles prepared with the powder blend compositions and processes of the previous aspects of the present invention.

The term "weight percent" as referred to herein is meant to refer to the weight fraction of a component based on the total weight of the composition.

The term "CVR" as referred to herein is meant to refer to the "chlorinated vinyl resins" as described herein.

The term "CM" as referred to herein is meant to refer to the "cellulosic materials" as described herein.

The term "CVR/CM" as referred to herein is meant to refer to a material containing both CVR and CM.

The term "phr" as referred to herein is meant to refer to parts per hundred weight based on CVR.

The term "total water addition" as referred to herein is meant to refer to the amount of water in the CVR/CM components.

The term "fluid" as referred to herein is meant to refer to a material having either a gas or liquid physical state.

DETAILED DESCRIPTION OF THE INVENTION

It has now been found that a particular combination of chlorinated vinyl resins, thermal stabilizers, lubricants, high MW polymer processing aids, and cellulosic materials is capable of providing powder blend compositions having a high weight percentage of cellulosic materials which are extrudable into foamed and nonfoamed extrudates having good surface appearance. The powder blend compositions of the present invention have from 30 to 65, preferably from 35 to 60, most preferably from 40 to 55 weight percent of at least one chlorinated vinyl resin; from 0.25 to 5, preferably from 0.5 to 3, most preferably from 0.5 to 1.5 weight percent of at least one thermal stabilizer; from 1.5 to 5, preferably from 1.5 to 4, most preferably from 1.5 to 3 weight percent of at least one lubricant; from 3.5 to 15, preferably from 4 to 12, most preferably from 5 to 10 weight percent of at least one high MW polymer processing aid; and from 24 to 65, preferably from 30 to 60, most preferably from 34 to 52 weight percent of at least one cellulosic material.

Suitable chlorinated vinyl resins useful in the present invention include polyvinyl chloride ("PVC") chlorinated polyvinyl chloride ("CPVC") and copolymers and blends comprising vinyl chloride monomers. PVC is a preferred chlorinated vinyl resins which is a common commodity thermoplastic polymer. PVC can also be combined with other vinyl monomers in the manufacture of polyvinyl chloride copolymers. Such copolymers can be linear copolymers, branched copolymers, graft copolymers, random copolymers, regular repeating copolymers, block copolymers, etc.

Monomers that can be combined with vinyl chloride to form vinyl chloride copolymers include an acrylonitrile; alpha-olefins such as ethylene, propylene, etc.; chlorinated monomers such as vinylidene dichloride; acrylate monomers such as acrylic acid, methyl acrylate, butyl acrylate, methyl methacrylate, acrylamide, hydroxyethyl acrylate, and others; styrenic monomers such as styrene, alphamethyl styrene, vinyl toluene, etc.; vinyl acetate; and other commonly available ethylenically unsaturated monomer compositions.

Such monomers can be used in an amount of up to about 50 mol %, the balance being vinyl chloride to provide suitable chlorinated vinyl resins yielding powder blends. Polyvinyl chloride forms a number of known polymer alloys including, for example, polyvinyl chloride/nitrile rubber; polyvinyl chloride and related chlorinated copolymers and terpolymers of polyvinyl chloride or vinylidene dichloride; polyvinyl chloride/alphamethyl styrene-acrylonitrile copolymer blends; polyvinyl chloride/polyethylene; polyvinyl chloride/chlorinated polyethylene; and others. The vinyl chloride resin component of this invention includes such polymer alloys of PVC as well as alloys of PVC copolymers.

The primary requirement for the substantially thermoplastic polymeric material is that it retain sufficient thermoplastic properties to permit melt blending with cellulosic materials, permit processing into thermoplastic extrudates using conventional processing equipment known in the plastics processing art to form rigid structural members which can further be foamed or unfoamed.

Polyvinyl chloride homopolymers, copolymers, and polymer alloys are commercially available from Geon Chemicals, Avon Lake, Ohio and Georgia Gulf, Plaquemine, La. Preferred polyvinyl chloride materials are polyvinyl chloride homopolymer having a K value of between 50 and 67; K50 is preferred for processing foamed compositions as it has a lower molecular weight and viscosity which desirably results in foams having relatively low densities.

The chlorinated vinyl resins may also contain up to 50% by weight water (e.g., in the form of a slurry, concentrated suspension, or wetcake) when provided to the process for preparing the powder blends. The processes according to this invention provide for removing this excess water.

The thermal stabilizers of the compositions of the present invention are present to allow for the processing of molten chlorinated vinyl resins, especially PVC, at elevated temperatures with minimal degradation. Suitable thermal stabilizers for the composition include all of the generally known thermal stabilizers in the PVC art, including metal soaps, epoxidized oils, alkyl and aryl phosphites, hindered phenols (with metal soaps), organotin mercaptides and organotin mercaptoesters, polyhydric alcohols, mixed-metal stabilizers (e.g., Zn/Cd) and basic lead stabilizers. Organotin stabilizers are commercially available and include methyl tins, butyltins, octyltins, and estertins. Various organotin derivatives including sulfides, oxides, carboxylates (salts of fatty acids and maleic acid), unsubstituted mercaptides, mercaptoacid esters, mercaptoalcohol esters, and mercaptocarboxylates are know. Many tin-based thermal stabilizers available by the tradename ADVASTAB are commercially available from Rohm and Haas Company, Philadelphia, Pa. Further details relating to thermal stabilizers can be found in "Plastics Additives and Modifiers Handbook", J. Edenbaum, Ed., Van Nostrand Rein, 1992, Chapters 17–20.

Suitable lubricants useful in the present invention for processing PVC/WF blends include those suitable for PVC and include "internal" and "external" lubricants, as well as those classified as having a balance between internal and external lubricating properties. Suitable internal lubricants include monoglycerin esters, stearyl alcohol, stearic acid, fatty-acid amides such as ethylene bis-stearamide (i.e., two C16–C18 alkyl groups covalently bonded to a central polar amide group), soaps, and stearate salts such as calcium stearate. Suitable external lubricants include long chain montan acid (i.e., a long chain C28–C32 alkyl group covalently bonded to a polar group, such as carboxylic acid), paraffins and hydrocarbons having short branched chain alkyl groups, n-paraffins having long straight chain hydrocarbons, polyethylene waxes having very long straight hydrocarbon chains with a few branches. Suitable lubricants that provide a balance between internal and external lubrication include synthetic fatty acid partially saponified with calcium and long-chain montan ester types (e.g., Wax OP, and Wax E available from American Hoechst Corp., Mountainside, N.J.). Further information on lubricants for PVC can be found in a review by McMurrer, M. C., Ed. "Update: Lubricants for PVC", Plastics Compounding, pp. 74–90 July/August 1982.

Suitable high MW polymer processing aids useful in the present invention include polymers and copolymers containing vinyl aromatic, (meth)acrylonitrile, and/or alkyl (meth)

acrylate monomers, having a molecular weight greater than 50,000 g/mol, preferably greater than 500,000 g/mol, and most preferably greater than 5,000,000 g/mol. Copolymers containing a majority of methyl methacrylate ("MMA") and a minority of alkyl acrylates, such as ethyl acrylate, butyl acrylate, or 2-ethyl hexyl acrylate are preferred. In this invention, core-shell-type processing aids that combine an external lubricant functionality with that of processing aid functionality are also useful as high MW polymer processing aids. These "lubricating-processing aids" provide the typical processing-performance properties of acrylic processing aids, but have the added advantage of an external-lubricant function, which improves flow and machine running time by significantly reducing sticking of the molten chlorinated vinyl resin to hot metal surfaces of the processing equipment. Commercially available high MW polymer processing aids are available from the Rohm and Haas Company, Philadelphia, Pa. under the tradename PARALOID.

Suitable cellulosic materials useful in the present invention derive generally from wood sources such as wood fiber, saw dust, wood flour, paper, recycled paper, card board, paper packaging, dried plants, grain hulls, nut shells, and the like. Other suitable cellulosic materials also include natural fibers such as hemp, sisal, jute, cotton, and the like. Wood fiber, in terms of abundance and suitability, can be derived from either soft woods or from hard woods. Hard woods generally provide fibers which are shorter than soft woods and generally provide powder blends which have better flow properties. Ideally, particles of cellulosic material should on average have a small aspect ratio for providing powder blend compositions having good powder flow properties. These particles are generally provided by a mechanical processing step performed on the cellulosic materials, such as cutting, grinding, threshing, cracking, chopping, mashing, stripping, sanding, sawing, carving, engraving, scraping, and the like. Aspect ratios of the cellulosic materials can range from 1 to 100, and preferably from 2 to 10. If the aspect ratio is too high then the cellulosic particles have a tendency to reduce the flowability and extrudability of the powder blends. If the aspect ratio is less than about 2 then there is some loss in the tensile strength and stiffness of composite materials made using the powder blend compositions of the present invention. The cellulosic materials which generally have small aspect ratios are the wood flours, especially the wood flours derived from hard woods, which are preferred. Suitable wood flours have a particle size in the range of 10 to 200 mesh, preferably 20 to 80 mesh. While wood flour is the primary source of fiber for the invention, additional fiber make-up can be derived from a number of secondary or fiber reclaim sources including bamboo, rice, sugar cane, and recycled fibers from newspapers, boxes, computer printouts, etc.

Cellulosic materials typically absorb water (moisture) upon standing in ambient conditions. For example, wood flours generally have about 7 weight percent moisture. Because moisture in CVR/CM materials is generally deleterious to its physical properties (e.g., reduced tensile strength), it is generally desirable to minimize the amount of water in CVR.CM materials. Although it is preferred that the cellulosic material components have less than 7 weight percent water, the processes for preparing the powder blends of this invention are not limited by the moisture content of the cellulosic materials.

For example, wood flour containing up to 15 weight percent water may also be used in the present inventions. The extrudable free-flowing powder blend compositions of the second aspect of the present invention have from 40 to 55 weight percent of at least one PVC resin; from 0.5 to 1.5 weight percent of at least one thermal stabilizer; from 1.5 to 3 weight percent of at least one lubricant; from 5 to 10 weight percent of at least one high MW polymer processing aid; from 34 to 52 weight percent of at least one wood flour; from 3 to 15 weight percent of at least one mineral filler; and up to 3 weight percent of at least one blowing agent.

Suitable PVC resins, thermal stabilizers, lubricants, high MW polymer processing aids, and wood flour for the second aspect of the present invention are described above.

Suitable mineral fillers useful in the present invention include calcium silicate, zinc oxide, barium sulfate, calcium sulfate, magnesium silicate, diatomaceous silica, talc, aluminum silicate, various clays, and metallic oxides. Calcium carbonate is preferred. Other mineral fillers known in the art are also envisioned as providing the free-flowing powder properties of the powder blends of the present invention. Mineral fillers are often used in PVC to lower cost and are distinguished from the cellulosic materials which are considered as a non-mineral filler.

Fillers not only are incorporated to reduce cost of the CVR/CM powder blends, but are also used to opacify articles produced from the powder blends. Mineral fillers also reduce the coefficient of expansion and shrinkage of articles prepared from the CVR/CM powder blends of the present invention. Use of too high concentrations of mineral fillers detracts from many physical properties of a CVR/CM foamed or nonfoamed article. The addition of mineral fillers is not only found to increase the flexural modulus or rigidity of articles made according to the present invention, but mineral fillers also improve the powder flow properties. Improved flexural modulus is desirable in nonfoamed applications, such as large bore tubing which resists sagging during field use. With calcium carbonate, as with most mineral fillers, particle size is important for determining the filler's performance in articles made according to the second aspect of the present invention. If the mineral filler average particle size ("PS") is greater than about 100 microns then the surfaces of extruded articles will tend to be rough. PS values greater than about 5 microns also adversely reduces the impact strength of articles prepared with the CVR/CM powder blend compositions of the present invention, especially at higher use levels. If the mineral filler particle size is smaller than about 0.1 micron then the powder will be quite dusty, thereby making handling difficult. The preferred mineral fillers have a mean PS of about 0.5 to 2.0 microns. Filler amounts are in the range of from 3 to 15, preferably from 5 to 10 weight percent. The mineral fillers affect the processing of CVR/CM compositions to a slight degree. Filler particles which are generally spherical in shape tend to provide compositions, which when melted, flow better than such compositions prepared with irregularly shaped filler particles. The filler is mildly abrasive, creating a scrubbing action that may help to remove deposits on processing equipment surfaces (i.e., "plate-out"). Too high amounts of mineral fillers are also detrimental as they will cause processing equipment wear as a result of abrasion. To minimize this effect, coarse fillers should be avoided.

The particle sizes of various CaCO3 fillers which are useful in the present invention and are commercially-available from Omya, Inc., Proctor, Vt., are as follows:

| Grade | Mean particle size (microns) |
|---|---|
| Ultra-Pflex | 0.07 |
| Omyacarb UFT | 0.7 |
| Omyacarb 1T | 1.0 |
| Omyacarb 2T | 2.0 |
| Omyacarb 3T | 3.0 |

The Omya UFT filler is particularly useful in compositions containing PVC as the vinyl chloride resin and WF as the cellulosic material.

Although most mineral fillers are white or off-white in color, they should not be confused with true pigments, which can optionally be added to the CVR/CM powder blends. Optional pigments used for coloring PVC plastic are well known in the art and include those which are mineral-based, such as titanium dioxide (white) as well as those which are organic-based, such as copper phthalocyanine (blue). Selection of other colorants, such as dyes and optical brighteners for controlling the color of the CVR/CM articles is within the abilities of those skilled in the art. The total amount of optional colorants used may be up to 3 percent weight of the total CVR/CM powder blend composition. In this case, the total amount of colorants and mineral filler will be maintained between 3 and 15 weight percent.

The powder blends of the present invention may further contain optionally at least one blowing agent for the purposes of producing CVR/CM foamed articles. The amount or proportion of the blowing agent used will vary depending upon the type of blowing agent and the desired properties of the composite material. The powder blends of the present invention may further contain optionally an amount of between up to 5, preferably from 0.2 to 5, most preferably from 0.2 to 3 weight percent of at least one blowing agent for the purposes of producing CVR/CM foamed articles.

Any suitable blowing agent compatible with the other components used to produce the CVR/CM foams may be used. There are two major types of blowing agents: physical and chemical. Physical blowing agents tend to be volatile liquids or compressed gases that change state during the processing to form a cellular structure. Chemical blowing agents tend to be solids that decompose thermally to form gaseous decomposition products. The gases produced are finely distributed in the thermoplastic melt to provide a cellular structure. Preferably, the one or more blowing agents include a chemical blowing agent.

Chemical blowing agents can be further classified as organic and inorganic. The organic blowing agents are available in a wide range of different chemistries, physical forms, and modification, for example azodicarbonamide. Inorganic blowing agents are more limited. A typical inorganic blowing agent is comprised of sodium bicarbonate and citric acid, which evolve carbon dioxide upon decomposition. Chemical blowing agents are usually supplied in powder form or pellet form. The specific choice of the blowing agent will be related to the cost, desired cell development and gas yield and the desired properties of the composite material.

In the present invention, the chemical blowing agent is preferably supplied as a powder and is mixed in the CVR/CM powder blends to provide CVR/CM foams for purposes of density or hardness reduction and to improve the heat or sound insulation properties. The CVR/CM foam composition during processing is modified by the formation of voids within the matrix, or cells, by the action of a chemical blowing agent. The blowing agent forms cells through the release of gas at the appropriate time during processing. Further, the permeability of the blowing agent gas within the polymer and the volume of gas released per unit weight of agent are important factors in selecting the blowing agent. These factors are referred to as the blowing or foaming agent efficiency. Effective blowing agents should yield at least 100 to 200 cc of gas per gram of agent at standard temperature and pressure. Depending on the degree of foaming, that is, the volume fraction of the foamed matrix made up of voids, the properties of such end product composite materials may be remarkably different from the solid or base CVR/CM material.

The range of commercially available chemical blowing agents is extensive. However, it is preferred to select a powdered material with small particle size which is compatible with the lubricant. It is known in the art that the activation of the blowing agent may be enhanced and promoted by stearic acid present in the one or more lubricants. As well, the dispersion in the dry powder blends may be aided by the wetting action of the polymer by the lubricants and an enhanced coating of the polymer particles by the blowing agent prior to processing.

Suitable inorganic chemical blowing agents include sodium bicarbonate and citric acid. Suitable organic chemical blowing agents have an unactivated decomposition temperature in the processing range of the CVR/CM composite. Suitable organic chemical blowing agents and their unactivated decomposition temperatures include p-toluene sulfonyl hydrazide ("TSH": 120 C), p,p-oxybis(benzene sulfonyl hydrazide) ("OBSH": 165 C)), azodicarbonamide ("AZO": 195–210 C), dinitrosopentamethylene tertramine ("DNPT": 200 C), p-toluene sulfonyl semicarbazide ("TSSC": 235 C), and 5-phenyl tetrazole (245 C). Many of these organic chemical blowing agents are commercially available from Hughes Industrial (Kennesaw, Ga.) and Uniroyal Chemical Co. AZO and sodium bicarbonate are the preferred blowing agents used. It is also desirable to combine one or more these blowing agents, including one or more organic chemical blowing agents (i.e., AZO) with an inorganic chemical blowing agent (i.e., sodium bicarbonate).

The blowing agents may also be used in combination with cell-control (cell stabilizing) agents, normally surface-active agents (surfactants) included in the powder blend composition. Such surfactants help stabilize the foam, control cell size, assist in mixing in gas (air), and eliminate overblow. Such surfactants are commercially available from Air Products, Allentown, Pa., and Dow Chemical, Midland, Mich.

Optionally, impact modifiers known in the art for modifying plastics resins can also be included in the powder compositions of the present invention for producing CVR/CM composites having increased toughness. Optionally, up to 15 weight percent of the total composition may be one or more impact modifiers, preferably up to 10 weight percent. Suitable impact modifiers known in the art are commercially available and include the commonly known "multistage" or "core/shell" polymer particles prepared substantially from methacrylate, styrene, and butadiene (e.g., "MBS") resins, MBS further comprising acrylonitrile monomers (e.g., "MABS"), acrylic impact modifiers (e.g., AIM) based on an acrylic rubber (e.g., polyalkyl acrylate) and an acrylic outer stage (e.g., polymethyl methacrylate), chlorinated polyethylene ("CPE"), and polymers having a siloxane rubber. Various MBS and AIM impact modifiers are available from the Rohm and Haas Company, Philadelphia, Pa.

Finally, the powder blend compositions of the present invention can optionally include other ingredients commonly used in matrix resin blends. These include plasticizers (e.g. dioctyl phthalates and the like), UV stabilizers, toners, rheology modifiers, flame retardants, smoke suppressants, anti-static agents, flatting agents, anti-blocking agents, antioxidants, mold release agents, and hollow spheres. These may be added in emulsion, liquid or powder form, useful amounts of which are well known in the art such as provided in "Plastics Additives and Modifiers Handbook", J. Edenbaum, Ed., Van Nostrand Rein, 1992.

The process of preparing CVR/CM powders according to the present invention further allows the introduction of water-based dispersions of the various components such that up to 25 weight percent of the total components introduced into the process can be water. Components supplied as water-based dispersions include high MW polymer processing aids, optional impact modifiers, thermal stabilizers, CVR, CM, fillers, lubricants, pigments, etc. Components preferably supplied as water-based dispersions include high MW polymer processing aids and optional impact modifiers because they are typically prepared as water-based dispersions using emulsion polymerization techniques.

High MW polymer processing aids and impact modifiers are commonly made in emulsion form, then isolated to powders, for example by coagulation or spray-drying. These isolation steps involve additional time and money for processing, and often result in product yield losses. Blending and processing of these components in emulsion form rather than powder form can be most advantageous as certain emulsions can be very difficult and/or expensive to isolate as powders. Typically, such components contain from 30 to 80 weight percent water when prepared as emulsions, which can be sufficiently removed according to a process according to the present invention. Equipment useful in powder blend processing include blenders, extruders or kneaders which can remove moisture from powder blends.

The addition of water-based dispersions of high MW polymer processing aids and/or impact modifiers provide equivalent results when compared to adding these components in powder form, with other components used in the amounts and modes of preparation as described herein. Thermokinetic blenders are preferably used to remove moisture from these blends. Typically 80–90% of the moisture can be removed with no adverse effects and the powder properties (e.g. funnel flow and loose bulk density). Suitable equipment is available from Henschel Mixers America, Inc. (Houston, Tex.). The introduction of certain components as water-based dispersions provide composite blend powders similar to that obtained with the equivalent components added in powder form. Similarly, these water-based dispersions when added according to the process of the present invention provide foam densities which are desirably low and good extrusion performance (i.e., power draw and output rates are satisfactory and comparable to that observed for addition of components in powder form).

The process of blending the various components (e.g., CVR, CM, thermal stabilizers, lubricants, high MW polymer processing aids, mineral fillers, blowing agents, and optional impact modifiers) generally involves blending the various components in suitable equipment, mixing and heating the blend to at least 50° C., preferably above 80° C., and most preferably above 100° C., and reducing moisture content in the final powdered blend to below three, preferably below two, and most preferably below one weight percent. Although the process is generally designed to reduce moisture, the step of removing moisture during the blending is not required if the components are dry or predried before blending. Various sequences of adding, heating and mixing the various components are sufficient for preparing powder blend compositions that are extrudable and provide smooth foamed and unfoamed extrudates.

A preferred component blending sequence (i.e., "blend cycle") is wherein the CM is added after the temperature is increased above 70° C., preferably above 85° C., and after thermal stabilizer is added to the CVR and optional blowing agents to form a first blend. Thermal stabilizers are preferably mixed with CVR in the first blend to ensure that it is absorbed preferably in the CVR, and less so within the CM where its effectiveness would be reduced. The pre-stabilized CVR could then be added with the CM at the ambient blender temperature. Lubricants, high MW polymer processing aids, and mineral fillers are subsequently added, mixed and heated. Moisture is vented to reduce the moisture content. This process provides for the lowest residual powder moisture contents and the lowest foam densities (when optional blowing agents are used) compared to similar processes wherein the CM is added at the beginning or at the end of the blend cycle.

Adding CM with CVR and optional blowing agents at the beginning of the blend cycle is also an acceptable component blending sequence. This process typically provides powder blends having high loose bulk densities and fast funnel flow rates. Resulting powders are readily extrudable and provide nearly equivalent extrusion pressures, output rates and extrudate quality as that of the preferred component blending sequence described above.

Adding CM at the end of the blend cycle is less desirable resulting in longer blending times required because CM lowers the blend temperature when added and must be heated again in order to drive off moisture. This generally provides a higher moisture level which reduces the quality of the powder properties. This leads to higher extrusion pressures, higher extrusion power input, and higher foam extrudate densities.

When the various components are added to the process, it is preferred that the total amount of water added is less than or equal to 25 weight percent, preferably less than 15 weight percent, and most preferably below 10 weight percent. When various components are added as water-based dispersions, it is also preferred that the total amount of water added is less than or equal to 25 weight percent, preferably less than 15 weight percent, and most preferably below 10 weight percent. When water-based dispersions of one or more components are added it is preferred that the one or more of the components which may be affected by water (such as blowing agents) are added subsequently to reducing the moisture content of the mixture below three percent, preferably below two percent, most preferably below one percent.

Lubricants are preferably added after the CM is added and after the temperature is increased above 60° C., preferably above 80° C. High MW polymer processing aids are preferably added subsequent to the lubricants. For providing powders having good flow properties, optional mineral fillers are preferably blended after the lubricants and high MW polymer processing aids.

It is also possible to first mix water-based components, such as aqueous dispersions of high MW polymer processing aids, with the CM, and subsequently or simultaneously removing water, prior to adding the other components.

It is known to persons skilled in the art to use equipment that is designed for removing up to 25% water from polymer-containing compositions. For example, the components can be blended in either powdered or aqueous form using standard equipment such as high-speed mixers, blenders, kneaders, extruders and/or fluidized drying beds. Various ingredients typically added in vinyl chloride resin formulations (e.g., lubricants, thermal stabilizers, waxes, pigments and fillers) would also be added in this same mixing equipment—either in aqueous form, liquid form, or powdered form. During this blending, the water that is added with the components would be evaporated as part of the process of heating the blend to the target temperature. Preferably, the mixing equipment is provided with means (such as vacuum or venting) to remove the water vapor that would be evolved during the blending operation.

The process for preparing a foamed extrudate generally involves the steps of feeding an extrudable free-flowing powder blend including at least one blowing agent into an extruder, melting the powder blend to form a melt in the extruder, extruding the melt from a die to form an expanding extrudate having at least one surface, and hardening the surface of the expanding extrudate with a cooling fluid to increase the expansion ratio of the foamed extrudate. The extrudate may have any extrudable shape including, but not limited to, rod, sheet, pipe, hollow and solid profile, film, and so on.

The steps of feeding, melting, forming, and extruding melts is well known to one skilled in the art of polymer processing. Typically, an extruder having a feed section and a metering section is utilized. Further details can be found in *Principles of Polymer Processing*, by Z. Tadmor and C. G. Gogos, John Wiley, 1979.

Hardening the surface of the expanding extrudate with a cooling fluid is readily accomplished by suitable fluid conveying equipment that directs the cooling fluid onto the surface of the expanding extrudate. When the cooling fluid is a gas, the fluid conveying equipment is preferably one or more "air knives", but other equipment are readily envisioned for directing a gas onto a surface for cooling, such as air curtains, doctor knives, fans, air amplifiers, vortex coolers, and the like.

When the extrudate is in the form of a sheet, cooling is applied to both the top and underside of the sheet extrudate as it exits the die face. This cooling can be done by using one or more air knives that are oriented towards the extrusion direction. Compressed air is supplied to the air knives through a valve assembly that controls the cooling air flow velocity. The air knives are preferably directed away from the die to cool the extrudate from the die exit and along down the extrudate length and to avoid cooling the die face. The air knives are placed at a distance in the range of 0.5 to 20, preferably 2 to 8 cm, away from the top and bottom surfaces of the extrudate surface.

It is preferred that the cooling fluid impinges the expanding extrudate near the point where it exits the die. If the cooling fluid impinges the expanding extrudate far from the die exit then the expanding gases (from the blowing agent) will have a chance to escape before the surface hardens; in this case the expansion ratio of the foam is not augmented by the cooling fluid. Preferably, the cooling fluid impinges the expanding extrudate at a distance in the range of from 1 cm to 20 cm from the die exit. It is also preferred that the cooling fluid is directed towards the extrudate surface so that the cooling fluid does not also impinge the die in order to avoid cooling the die. Keeping the die surface hot helps to maintain a good smooth appearance to the extrudate surface and minimize edge tearing.

Preferably, the cooling fluid that is used is air, but other gases such as inert gases (e.g., nitrogen, argon, helium), fluorochlorocarbons, and carbon dioxide may also be used. It is also possible to direct a cooling fluid in the liquid state, such as water, towards the expanding extrudate surface, however this is less desirable as handling the subsequent collection of liquids tends to be more cumbersome than handling gases. Using cooling fluids other than air may be desirable wherein the cooling fluid also performs a function, such as cleaning or treating the extrudate surface.

This paragraph suggests a possible explanation as to the cause of the phenomena wherein use of the cooling fluid augments the expansion of the foamed extrudate, however it is not intended to limit the scope of the invention. While not intending to be bound by theory, the present inventors believe the purpose of the cooling air is to allow the extrudate "skin" to solidify more quickly and prevent cell forming gas to escape. Cell expansion continues within the core of the cooled surface of the extrudate (e.g., sheet) until an equilibrium between the cell gas pressure and the viscosity of the extrudate has been reached. The expansion ratio is the ratio of the thickness of the final cooled foamed sheet to the thickness of the sheet at the die exit. At this point, a maximum thickness is achieved that is not affected by draw down due to sheet pulling rates. Without the cooling supplied by the cooling fluid, the maximum sheet thickness is limited by the tension of the downstream take-off rate. Benefits to the physical properties include a dramatically thicker part dimension (greater expansion ratio) and lower overall density. The cooled foamed extrudate can be subsequently processed (e.g., embossed, pressed, molded, turned, drilled, thermoformed, cut, etc.) to provide articles (e.g., building products such as window profiles and siding).

A series of heated and cooled contact surfaces can also be employed after the air knives to repeatedly melt and cool the sheet "skin" to provide a surface that is very hard, smooth, and aesthetically pleasing in appearance. For example, chrome rolls varying in temperature can be used to alter the surface of the foamed extrudate after the surface is hardened. Alternatively, heated and cooled presses can be used to alter the appearance, surface hardness, and density of cut pieces of foamed extrudate sheet.

The composite of the present invention has a substrate layer made from an extrudable thermoplastic resin, and has at least one capstock layer disposed thereon made from an extrudable free-flowing powder blend composition of the present invention.

The composite of the present invention can be made by extruding a plurality of layers of thermoplastic extrusion compounds, and applying these layers together in a particular fashion. At least one of the thermoplastic extrusion compounds will be the capstock composition according to the first or second aspects of the present invention and disposed upon at least one other thermoplastic extrusion compound functioning as at least one substrate layer. It is also envisioned that the capstock composition can be extruded in multiple layers to allow for additional protection on one or more sides of the composite.

A typical capstock can be from 0.1 to 1.0 mm thick whereas the structural plastic substrate can be about 0.8 to 1.8 mm thick for PVC siding applications, and from 1.2 to 3.0 mm for PVC profile applications (e.g., PVC window frames, fencing, decking, and rain gutters). If the capstock and substrate are too thick then the articles made therefrom will suffer too great cost, whereas if they are too thin then they will be lacking in strength.

The substrate layer may also be formed by an extrusion of a thermoplastic resin. The thermoplastic resin may be any of the extrudable thermoplastic resins known in the art, examples of which are described in U.S. Pat. No. 5,318,737, incorporated herein by reference for its disclosure of extrudable resins and extrusion processes. The substrate may be foamed, but it is preferably not foamed to afford rigidity to the composite.

Preferred extrudable thermoplastic resins which are especially useful for making building products, but which are improved in appearance from a capstock layer made from the CVR/CM compositions of the present invention include PVC, chlorinated polyvinylchloride ("CPVC"), high impact polystyrene ("HIPS"), polypropylene ("PP") and acrylonitrile-butadiene-styrene ("ABS"). It is also preferred that the extrudable thermoplastic resins of the capstock and substrate layers adhere to one another to prevent delamination of the composite. Adhesion can be promoted through selection of resins and compositions which are compatible and/or miscible with one another (e.g., PVC/WF compositions of the present invention coextruded with PVC). Various methods known in the art, such as surface treatment with adhesion promotes (i.e., corona-discharge) and/or application of an adhesive, are envisioned for improving the adhesion between the substrate and capstock layers of the composite.

The composites of the present invention can have a substrate layer of an extrudable thermoplastic resin, and a capstock layer of the capstock composition in according to the first aspect of the present invention disposed thereon. The composites are preferably prepared by coextrusion but can also be formed by laminating preformed sheets or films of a substrate and the capstock together by thermal fusion or by adhesive.

Preferred extrudable thermoplastic resins used as the substrate layer in the composites of the present invention include PVC, CPVC, high impact polystyrene (HIPS), polypropylene (PP) and acrylonitrile-butadiene-styrene resins (ABS) and styrene-acrylonitrile resins (SAN). Preferably, the capstock layer is a PVC/WF blend according to the present invention containing from 40 to 55 weight percent of at least one PVC resin, from 0.5 to 1.5 weight percent of at least one thermal stabilizer, from 1.5 to 3 weight percent of at least one lubricant, from 5 to 10 weight percent of at least one high MW polymer processing aid, from 34 to 52 weight percent of at least one wood flour, from 3 to 15 weight percent of at least one mineral filler, and up to 3 weight percent of at least one blowing agent.

The articles, sheet extrudates, and composites of the present invention can also be subsequently thermoformed into articles thereof which varying in shape using standard thermoforming processes known in the art.

The articles, sheet extrudates, and composites, and thermoformed articles thereof of the present invention can also be subsequently stained or coated using standard staining techniques known in the art.

EXAMPLES

General Procedure for Preparing CVR/CM Powder Blends—All Components Substantially Dry Powders A blending scheme (which is described below) has been developed which provides adequate mixing and moisture removal without any additional processing steps. The procedure allows cellulosic materials (e.g., wood flour) to be added with a moisture content up to about 7% that results in a powder blend composition having a moisture content of less than about 0.5%. By following this blending sequence, wherein the lubricants are added after adding the CVR and CM, but before adding the high MW polymer processing aid powder, the amount of dust is reduced and the blend mixes more uniformly than if the lubricants were added after the high MW polymer processing aid powder.

CVR resin is placed into a Henschel high speed blender. Optional blowing agent is mixed by hand using a spatula into the CVR resin. The blender agitation is started on low speed and (optionally) heat is applied. The thermal stabilizer is added when the temperature reaches about 50° C. Subsequently, the blender agitation speed is increased. The blender agitation is stopped when the temperature reaches about 90° C., at which point CM is added. After adding the CM the temperature will be reduced to about 50° C. at which point the blender agitation is restarted at low speed. The window on the blender lid is opened. The blender is vented using an exhaust ventilation hose near the opened window to pull away any escaping water vapor. The lubricants are gradually added and the powder blend is allowed to reach about 100° C. This temperature is maintained while removing water vapor. The temperature begins to increase when most of the moisture has been removed. At this point, the high MW polymer processing aids and optional impact modifiers are gradually added, followed by gradually adding the optional pigments and fillers. The powder blend is heated to about 110° C. to ensure that the moisture content is less than about 0.5 weight percent. The powder blend is cooled to a temperature sufficient for safe handling (less than about 65° C.) and transported to suitable extrusion equipment.

During the blending process, it is desirable to check the powder blend to attain a good mixing vortex by adjusting speed and/or deflecting paddles in blender (if available). It is worthwhile to note that blends with relatively high CM amounts generally cool rapidly and may require external heating. Finally, optional blowing agents are used primarily for preparing cellular (foamed) compositions. Blowing agents are not used for preparing non-foamed powder blend compositions.

TABLE 1

General Description and Source of Components Used in the Examples

| Component | Source (Company) |
| --- | --- |
| Chlorinated vinyl resins | Polyvinyl Chloride - PVC; "OXY 200" (Oxychem), "BCP - 57" (Borden), Geon 110x450 Molecular weight grades: K50, K57, K62, K67 |
| Thermal Stabilizers | ADVASTAB ® TM-181 (Rohm and Haas) MARK 1915 tin thermal stabilizer for foam (Witco, Hahnville, LA) |
| Lubricants | CaSt - Calcium Stearate/regular - (Witco, Hahnville, LA) Wax 165 - paraffin wax HOSTALUB XL-165 (Clariant) AC629A - oxidized polyolefin wax (Allied-Signal) LOXIOL G60 - neutral dicarboxylic acid ester of unsaturated fatty alcohols (Henkel) |
| High MW Polymer Processing Aids | PARALOID ® K175, PARALOID ® K400 (Rohm and Haas), HPPA-W, HPPA-P (see text below) |
| Cellulosic Materials | Wood Flour - WF, 80 mesh (American Wood Fibers), aspect ratio = 3 to 1 (length to width) |
| Mineral Fillers | OMYACARB UFT CaCO3 - Calcium Carbonate, 1.0 micron mean PS, (Omya, Inc.) |
| Optional Impact | IM-W, IM-P (see text below) |

TABLE 1-continued

General Description and Source of Components Used in the Examples

| Component | Source (Company) |
|---|---|
| Modifiers | |
| Optional Pigments | TIPURE ® - TiO2 - titanium dioxide (DuPont) |
| Optional Blowing Agents | AZO (Uniroyal AZRV grade, Hughes Industrial HRVP33 grade); NaHCO3 - Sodium Bicarbonate (Dwight and Church) |

General Description of Extrusion of Powder Compositions to Prepare Extrudates Because cellulosic materials (e.g., wood flour) are good thermal insulators, the use of typical extrusion temperature profiles (i.e., increasing the temperature in the metering zone to higher than that of the feed zone) makes it difficult to pull vacuum and remove residual moisture without also undesirably removing powder. When a reverse temperature profile is used (i.e., temperature highest in the feed zone and gradually decreasing toward the metering zone), vacuum can be used to remove moisture without powder buildup in the vent area. As a result, powders were extruded into sheet using a plastics processing KMDL extruder at the following conditions: Barrel Zone 1 ("BZ1")/Barrel Zone 2 ("BZ2")/Die ("D")/Screw Oil=185/180/185/170° C.

Reference Example 1 and Example 2

The following examples show that the lubricant system in PVC/WF powders for foamed composites must be adjusted on a weight percent basis to match the levels in a PVC formulation to demonstrate good processing performance. When this is done, processing and product quality are greatly improved in surface quality and edge quality versus that taught in the prior art. Appearance of the extrudates are provided in Table 2 below.

TABLE 2

| | Reference Ex. 1 | | Ex. 2 | |
|---|---|---|---|---|
| Components | phr | % | phr | % |
| PVC (OXY 200) | 100.00 | 87.15 | 100.00 | 47.46 |
| AZRV | 0.65 | 0.57 | 1.20 | 0.57 |
| Mark 1915 | 1.50 | 1.31 | 1.50 | 0.71 |
| CaSt | 1.20 | 1.05 | 2.20 | 1.04 |
| Wax 165 | 0.80 | 0.70 | 1.60 | 0.76 |
| AC629A | 0.10 | 0.09 | 0.20 | 0.09 |
| K175 | 0.50 | 0.44 | 1.00 | 0.47 |
| K400 | 6.00 | 5.23 | 11.00 | 5.22 |
| TiO2 | 1.00 | 0.87 | 0.00 | 0.00 |
| CaCO3 | 3.00 | 2.61 | 12.00 | 5.70 |
| Wood flour | none | none | 80.00 | 37.97 |
| TOTAL | 2.10 | 1.84 | 4.00 | 1.89 |

TABLE 2-continued

| | Reference Ex. 1 | | Ex. 2 | |
|---|---|---|---|---|
| Components | phr | % | phr | % |
| LUBRICANTS TOTAL HIGH | 6.50 | 5.67 | 12.00 | 5.69 |
| MW POLYMER PROCESSING AIDS TOTAL COMPONENTS | 114.75 | 100.00 | 210.70 | 100.00 |
| Foam Density (g/cc) | 0.69 | | 0.95 | |
| Foam Extrudate: | | | | |
| Surface Quality | good | | good | |
| Edge quality | good | | good | |

Comparative Examples 1–5 and Examples 6–8

Effect of Varying Amounts of Total Lubricants and High MW Polymer Processing Aids The following comparative examples 1–5 and examples 6–8 show that good quality extrudates having smooth surfaces and edges are obtained when both the total weight percentage of lubricants and high MW polymer processing aids is greater than about 1.5, and 3.5 weight percent, respectively. Powders were extruded into sheet using a plastics processing KMDL extruder at the following conditions: (BZ1/BZ2/D/Screw Oil=185/180/185/170° C.). Appearance of the comparative extrudates are provided in Table 3 below.

Observations of these comparative results show very rough surface and edge quality for Comparative Example 1, and that further increasing CaSt levels did not affect surface or edge quality (Comparative Example 2). Furthermore, although increasing paraffin and PE wax improved surface quality, edge quality became worse (Comparative Example 3). Comparative Example 4 shows that increasing all wax levels had no visual improvement over Comparative Example 3, however it gave lowest extrudate density and highest output rates.

High My polymer processing aids are beneficial in maintaining good melt strength in CVR/CM compositions. As shown in these examples, the total weight percentage of high MW polymer processing aids should be maintained to at least that used in standard PVC formulation on a weight percentage basis as the wood flour level is increased to have sufficient melt strength to process the PVC/wood flour composite (as shown in these examples).

These examples show that increasing just the total lubricants or just the total high MW polymer processing aids is not sufficient to give good melt flow and surface qualities. Both need to be increased to provide a good balance of processing properties.

TABLE 3

Effect of Varying Amounts of Total Lubricants and High MW Polymer Processing Aids

| | wt. % | | | | | | | |
|---|---|---|---|---|---|---|---|---|
| Component | Comp. Ex. 1 | Comp. Ex. 2 | Comp. Ex. 3 | Comp. Ex. 4 | Comp. Ex. 5 | Ex. 6 | Ex. 7 | Ex. 8 |
| PVC (BCP57) | 49.81 | 49.57 | 49.62 | 49.37 | 49.12 | 48.40 | 47.71 | 47.04 |
| AZRV | 0.32 | 0.32 | 0.32 | 0.32 | 0.59 | 0.58 | 0.57 | 0.56 |

TABLE 3-continued

Effect of Varying Amounts of Total Lubricants and High MW Polymer Processing Aids wt. %

| Component | Comp. Ex. 1 | Comp. Ex. 2 | Comp. Ex. 3 | Comp. Ex. 4 | Comp. Ex. 5 | Ex. 6 | Ex. 7 | Ex. 8 |
|---|---|---|---|---|---|---|---|---|
| Mark 1915 | 0.75 | 0.74 | 0.74 | 0.74 | 0.74 | 0.73 | 0.72 | 0.71 |
| CaSt | 0.60 | 1.09 | 0.60 | 1.09 | 1.08 | 1.06 | 1.05 | 1.03 |
| Wax 165 | 0.40 | 0.40 | 0.74 | 0.74 | 0.74 | 0.73 | 0.72 | 0.71 |
| AC629A | 0.05 | 0.05 | 0.10 | 0.10 | 0.10 | 0.10 | 0.10 | 0.09 |
| K175 | 0.25 | 0.25 | 0.25 | 0.25 | 0.49 | 0.48 | 0.48 | 0.47 |
| K400 | 2.99 | 2.97 | 2.98 | 2.96 | 2.95 | 4.36 | 5.73 | 7.06 |
| CaCO3 | 4.98 | 4.96 | 4.96 | 4.94 | 4.91 | 4.84 | 4.77 | 4.70 |
| Wood flour | 39.85 | 39.65 | 39.69 | 39.50 | 39.29 | 38.72 | 38.17 | 37.63 |
| TOTAL LUBRICANTS | 1.05 | 1.54 | 1.4 | 1.93 | 1.92 | 1.89 | 1.87 | 1.83 |
| TOTAL HIGH MW POLYMER PROCESSING AIDS | 3.24 | 3.22 | 3.23 | 3.21 | 3.44 | 4.84 | 6.21 | 7.53 |
| TOTAL | 100.00 | 100.00 | 100.00 | 100.00 | 100.00 | 100.00 | 100.00 | 100.00 |
| Extrusion Output | | | | | | | | |
| rate (lbs/hr) | 6.6 | 7.0 | 6.2 | 6.9 | 7.3 | 7.9 | 7.1 | 7.1 |
| Linear rate (ft/hr) | 33.2 | 36.9 | 33.8 | 40.0 | 37.1 | 39.6 | 37.5 | 40.6 |
| Foam Extrudate: | | | | | | | | |
| Density (g/cc) | 1.02 | 0.95 | 1.00 | 0.94 | 1.12 | 0.92 | 0.94 | 0.91 |
| Surface Quality | Very Rough | Very Rough | Rough | Rough | Slightly Rough | Almost Smooth | Smooth | Hard, Very Smooth |
| Edge quality | Very Rough | Very Rough | Very Rough | Very Rough | Slightly Rough | Almost Smooth | Smooth | Hard, Very Smooth |

Examples 9–12

Effect of Increasing Amount of Cellulosic Material while Maintaining Relative Amount of Total Lubricants and High MW Polymer Processing Aids By maintaining the weight percentages of total lubricants and processing aids greater that 1.8% and 5.6%, respectively, CVR/CM powder blend compositions containing up to 42.90% (100 phr) of cellulosic material (herein wood flour) can be achieved that provide good quality extrudates having smooth surfaces and edges. Powders were extruded into sheet using a plastics processing KMDL extruder at the following conditions: (BZ1/BZ2/D/Screw Oil=185/180/185/170° C.). Appearance of the resulting extrudates are provided in Table 4 below. All of these compositions processed well and surface smoothness improved as the percentage of wood flour was increased from Example 9 to Example 12. Output rates decreased from Example 9 to Example 12 due to lower bulk density of the powder blend arising from higher percentages of lower-density wood flour.

TABLE 4

Effect of Increasing Amount of Cellulosic Material wt. %

| Component | Ex. 9 | Ex. 10 | Ex. 11 | Ex. 12 |
|---|---|---|---|---|
| PVC (BCP57) | 60.48 | 53.19 | 47.48 | 42.90 |
| AZRV | 0.57 | 0.59 | 0.57 | 0.56 |
| Mark 1915 | 0.91 | 0.80 | 0.71 | 0.64 |
| CaSt | 1.09 | 1.06 | 1.04 | 1.03 |
| Wax 165 | 0.73 | 0.69 | 0.71 | 0.69 |
| AC629A | 0.09 | 0.11 | 0.09 | 0.09 |
| K175 | 0.45 | 0.48 | 0.47 | 0.47 |
| K400 | 5.44 | 5.32 | 5.22 | 5.15 |
| CaCO3 | 6.05 | 5.85 | 5.70 | 5.58 |
| Wood flour | 24.19 | 31.91 | 37.99 | 42.90 |
| TOTAL LUBRICANTS | 1.91 | 1.86 | 1.84 | 1.81 |
| TOTAL HIGH MW POLYMER PROCESSING AIDS | 5.89 | 5.80 | 5.69 | 5.62 |
| TOTAL | 100.00 | 100.00 | 100.00 | 100.00 |
| Extrusion Output | | | | |
| rate (lbs/hr) | 8.0 | 7.3 | 7.2 | 6.6 |
| Linear rate (ft/hr) | 46.3 | 43.9 | 45.0 | 37.2 |
| Foam Extrudate: | | | | |
| Density (g/cc) | 0.95 | 0.91 | 0.96 | 1.03 |
| Surface Quality | Smooth | Smoother → | | Very Smooth |
| Edge quality | Smooth | Smoother → | | Very Smooth |

Examples 13–16

Effect of Varying Molecular Weight of Vinyl Chloride Resin

By maintaining the weight percentages of total lubricants and processing aids greater that 1.8% and 5.6%, respectively, CVR/CM powder blend compositions containing chlorinated vinyl resins of various molecular weights (herein K50, K57, K62, and K67 PVC), and about 38% (80 phr) of cellulosic material (herein wood flour) can be achieved that provide good quality extrudates having smooth surfaces and edges. Powders were extruded into sheet using a plastics processing KMDL extruder at the following conditions: (BZ1/BZ2/D/Screw Oil=185/180/185/170° C.). Appearance of the resulting extrudates are provided in Table 5 below. All of these compositions processed well and surface smoothness improved as the molecular weight of the PVC increased from K50 in Example 16 to K67 in Example 13. Output rates increased while extrudate density decreased as the molecular weight of the PVC decreased from K67 in Example 13 to K50 in Example 16. Based on these examples it appears that the K50 PVC (lowest molecular weight tested) is best for producing foamed extrudates: it processes well, and provides the lowest density extrudate foam.

TABLE 5

Effect of Varying Molecular Weight of Vinyl Chloride Resin

| | wt. % | | | |
|---|---|---|---|---|
| Component | Ex. 13 | Ex. 14 | Ex. 15 | Ex. 16 |
| PVC (K67) | 47.48 | — | — | — |
| PVC (K62) | — | 47.48 | — | — |
| PVC (K57) | — | — | 47.48 | — |
| PVC (K50) | — | — | — | 47.48 |
| AZRV | 0.57 | 0.57 | 0.57 | 0.57 |
| Mark 1915 | 0.71 | 0.71 | 0.71 | 0.71 |
| CaSt | 1.04 | 1.04 | 1.04 | 1.04 |
| Wax 165 | 0.71 | 0.71 | 0.71 | 0.71 |
| AC629A | 0.09 | 0.09 | 0.09 | 0.09 |
| K175 | 0.47 | 0.47 | 0.47 | 0.47 |
| K400 | 5.22 | 5.22 | 5.22 | 5.22 |
| CaCO3 | 5.70 | 5.70 | 5.70 | 5.70 |
| Wood flour | 37.99 | 37.99 | 37.99 | 37.99 |
| TOTAL LUBRICANTS | 1.84 | 1.84 | 1.84 | 1.84 |
| TOTAL HIGH MW POLYMER PROCESSING AIDS | 5.69 | 5.69 | 5.69 | 5.69 |
| TOTAL | 100.00 | 100.00 | 100.00 | 100.00 |
| Extrusion Output | | | | |
| rate (lbs/hr) | 6.9 | 6.7 | 7.0 | 7.5 |
| Linear rate (ft/hr) | 35.1 | 35.4 | 38.5 | 43.2 |
| Extrudate: | | | | |
| Density (g/cc) | 1.14 | 1.08 | 0.99 | 0.97 |
| Surface Quality | Very Smooth | ← Smoother | | Smooth |
| Edge quality | Very Smooth | ← Smoother | | Smooth |

Examples 17 and 18

Effect of Varying Blowing Agent and Foam Type

By maintaining the weight percentages of total lubricants and processing aids greater than 1.8% and 5.6%, respectively, CVR/CM powder blend compositions containing different blowing agents for producing different types of foams can be produced. As much as 38% (80 phr) of cellulosic material (herein wood flour) can be used to produce good quality extrudates having smooth surfaces and edges. Powders were extruded into sheet using a conical twin 25 mm Krauss-Maffei (Austria) plastics processing KMDL extruder at the following conditions: (BZ1/BZ2/D/Screw Oil=185/180/185/170° C.). Appearance of the resulting foamed extrudates are provided in Table 6.

TABLE 6

Varying CVR/CM Foam Formulation

| | Ex. 17, "Outward Free Foam Formulation" | | Ex. 18, "Inward Foaming Formulation" | |
|---|---|---|---|---|
| Component | phr | wt. % | phr | wt. % |
| PVC (K57) | 100.00 | 47.46 | 100.00 | 46.86 |
| AZO | 1.20 | 0.57 | 0.40 | 0.19 |
| NaHCO3 | — | — | 2.80 | 1.31 |
| Mark 1915 | 1.50 | 0.71 | — | — |
| TM181 | — | — | 1.50 | 0.70 |
| G60 | — | — | 1.00 | 0.47 |
| CaSt | 2.20 | 1.04 | 1.00 | 0.47 |
| Wax 165 | 1.60 | 0.76 | 1.50 | 0.70 |
| AC629A | 0.20 | 0.09 | 0.20 | 0.09 |
| K175 | 1.00 | 0.47 | 2.00 | 0.94 |
| K400 | 11.00 | 5.22 | 11.00 | 5.15 |
| TiO2 | 0.00 | 0.00 | 2.00 | 0.94 |
| CaCO3 | 12.00 | 5.70 | 10.00 | 4.69 |
| Wood flour | 80.00 | 37.97 | 80.00 | 37.49 |
| TOTAL LUBRICANTS | 4.0 | 1.89 | 3.7 | 1.73 |
| TOTAL HIGH MW POLYMER PROCESSING AIDS | 12.0 | 5.69 | 13.0 | 6.09 |
| TOTAL | 210.70 | 100.00 | 213.40 | 100.00 |
| Foam Extrudate: | | | | |
| Density (g/cc) | 0.88 | | 0.63 | |
| Surface Quality | Good | | Good | |
| Edge quality | Good | | Good | |

In these foamed (cellular) PVC/wood flour composites, lower densities are achieved when the blowing agent level is increased on a weight percentage basis to maintain a total gas evolution constant on a total weight basis. Sodium bicarbonate blowing agent appears to provide lower densities than achieved with AZO (azodicarbonamide). Both compositions processed well and surface and edge quality were good. Example 18 also contained white pigment (TiO2).

Example 19

Using Filler to Provide Free-flowing Powders

The addition of wood flour generally lowers the bulk density and reduces powder flow. The addition of CaCO3 increases the bulk density and improves powder flow to a point where the PVC/WF blend can be extruded directly from the powder blend. As an example, a mixture consisting of 50 weight percent wood flour and 50 weight percent of a PVC foam powder composition (e.g., PVC, thermal stabilizer(s), blowing agent(s), lubricant(s), high MW polymer processing aid(s), and less than about 1.5% filler) was prepared according to the general process above. This PVC/WF powder blend composition had a powder bulk density of 0.342 g/cc, but it did not flow according to the funnel flow test in ASTM D 1895-96. A mineral filler (calcium carbonate) was added to the just described powder blend composition, such that the weight ratio of PVC foam compound/wood flour/CaCO3 blend was 48/48/4. The resulting powder blend was a free flowing powder having a very good funnel flow rate of 30 seconds and had a bulk density of 0.363 g/cc.

Examples 20 to 22

Procedure for Preparing CVR/CM Powder Blends wherein at Least One Component is Provided as a Water-based Dispersion The following examples demonstrate that at least one component of the powder blend compositions can be supplied as a water-based dispersion. The procedure for preparing CVR/CM powder blend compositions is substantially the same as that provided above with the exception that any water-sensitive components (e.g., the optional blowing agents) are added subsequently to removing most of the additional water through heating and venting to achieve less than about three weight percent residual moisture. The process described in Table 7 was used for preparing the powder blends described below in Examples 20 to 22 using a thermokinetic blender (e.g., Henschel or Papenmeier blender) having a cooling jacket. For each step prior to addition of the optional blowing agent, the blender was vented to allow most of the water to evaporate so that the remaining moisture amounts to less than about 3 weight percent. Total time for the entire process was about 30 minutes.

TABLE 7

General Process for Preparing CVR/CM Compositions in Examples 20 to 22

| Step # | Component Added at This Step | Addition Temp., °C. | Blender Speed, rpm |
|---|---|---|---|
| 1 | PVC Resin | 23 | 1000 |
| 2 | Tin Stabilizer | 50 | 2000 |
| 3 | High MW Polymer Processing Aid(s): | | |
|   | Acrylic Lubricating Processing Aid | 70 | 1000 |
| 4 | Acrylic Processing Aid | 70 | 2000 |
| 5 | Wood Flour, 80 mesh | 85 | 1000 |
| 6 | Acrylic Impact Modifier | 85 | 2000 |
| 7 | 25% of Calcium carbonate (filler) charge | 90 | 2000 |
|   | Lubricant(s): | 95 | 2000 |
|   | Neutral dicarboxylic acid ester of saturated fatty alcohols | | |
|   | Calcium stearate | 95 | 2000 |
|   | Paraffin Wax | 95 | 2000 |
|   | Oxidized LDPE Wax | 95 | 2000 |
| 8 | 25% of Calcium carbonate (filler) charge | 97 | 2000 |
|   | Chemical Blowing Agent | 100 | 1000 |
| 9 | 50% of Calcium carbonate (filler) charge | 110 | 1000 |
| 10 | Begin cooling blend by circulating water through jacket | 110 → 55 | 1000 |
| 11 | Remove contents from blender | < ca. 55 | 0 |

Preparation of a Water-based Dispersion of a High MW Polymer Processing Aid (HPPA-W)

Emulsion polymerization of an acrylic processing aid having a Mw of 6 million (measured by gel permeation chromatography) and composed of 84% methy methacrylate, 12% n-butyl acrylate, and 4% n-butyl methacrylate monomers. Parts are based on 100 parts of monomer used in this preparation (total of butyl acrylate, methyl methacrylate and butyl methacrylate).

79.679 parts of deionized water was added to an appropriate reactor fitted with a condenser and means of temperature measurement. The water was sparged with N2 for 30 minutes and heated to 47° C. 0.021 parts of glacial acetic acid was added, followed by the addition of 3.057 parts of a 45% solids aqueous emulsion polymer formed from 49% butyl acrylate, 49% methyl methacrylate and 2% methacrylic acid. Then, 1.646 parts of a commercial surfactant, Dowfax 2A1™, available from Dow Chemical was added to the same reactor. These additions were rinsed in with 2.7 parts of deionized water. Separately, a mix of 0.0061 parts of ethylenediaminetetraacetic acid, disodium salt, dihydrate, 0.00052 parts of iron (II) sulfate heptahydrate and 0.245 parts of deionized water was prepared. This mixture added to the reactor. The charges above were rinsed in with 2.7 parts of deionized water. The nitrogen sparge was changed to a nitrogen sweep.

In a separate container a monomer mixture was prepared comprised of 12 parts butyl acrylate, 83.9 parts methyl methacrylate and 4.0 parts of butyl methacrylate. 17.70 parts of this mix were added to the reactor. 0.0038 parts of sodium formaldehyde sulfoxylate; 0.0031 parts of a 70% aqueous solution of tert-butyl hydroperoxide and 1 part deionized water was then added to the reaction mixture.

After exotherming, the mixture was cooled to 41° C. and then 22.75 parts of the monomer mixture was added, followed by 0.0048 parts of sodium formaldehyde sulfoxylate, 0.0040 parts of a 70% aqueous solution of tert-butyl hydroperoxide and 1 part of deionized water.

After exotherming, the mixture was cooled to 32° C. 2.301 parts of Dowfax 2A1 and 1.2 parts of deionized water were added during cooling. The remaining 60.68 parts of the monomer mix was added, followed by 0.023 parts of sodium formaldehyde sulfoxylate, 0.027 parts of a 70% aqueous solution of tert-butyl hydroperoxide and 3.4 parts of deionized water.

After exotherming, 0.1 parts of butyl acrylate, followed by 0.0040 parts of sodium formaldehyde sulfoxylate, 0.0024 parts of a 70% aqueous solution of tert-butyl hydroperoxide and 4.6 parts of deionized water were added. The mixture was cooled to 35° C. Final solids weight percentage was 51.6%.

Preparation of a Powdered High MW Polymer Processing Aid (HPPA-P)

A portion of the HPPA-W dispersion was spray-dried to form a powdered high MW polymer processing aid, which is denoted HPPA-P.

Preparation of a Water-based Dispersion of an Impact Modifier (IM-W)

A water-based dispersion of an acrylic core//shell impact modifier (denoted IM-W) having a composition of 80 n-butyl acrylate//20 methyl methacrylate was prepared in emulsion by the following general procedure:

To an appropriate stirred reactor fitted with means for nitrogen addition, a reflux condenser, and means for adding monomers and other components, was charged 49.3 parts of deionized water and 0.021 parts of glacial acetic acid and heated to 45° C. while sparging with nitrogen. The nitrogen was then adjusted to sweep the atmosphere over the reaction mixture. 0.100 parts sodium formaldehyde sulfoxylate (SFS) in 2.33 parts of deionized water was prepared and added to the reactor. 12.6 parts of an acrylic seed emulsion was added to the reactor. 10% of an emulsified monomer mix (EMM) (containing 1.43 parts of a 28% aqueous mix of SLS, 21.8 parts of deionized water, 78.2 parts n-butyl acrylate, and 0.867 parts trimethylolpropane triacrylate), rinsed in with 0.699 parts of deionized water. 0.110 parts of cumyl hydroperoxide (CHP) was then prepared. 11% of this CHP charge was then added. The added initiator caused the reaction mixture to exotherm. In a similar manner, two additional EMM and CHP charges were added: the second comprised of 20% of the EMM and 18% of the CHP charges described above, the third comprised of 40% of the EMM and 39% of the CHP. For the fourth and final EMM addition, the remaining 30% of the EMM was modified, by adding 0.023 parts of allyl methacrylate before the EMM was added to the reactor. This was rinsed in with 2.69 parts of deionized water. The remaining 32% of the CHP was then added.

After exotherming, the emulsion was cooled to 55° C. in preparation for the second stage. After cooling, 0.023 parts of SFS dissolved in 1.13 parts of deionized water, 20.9 parts of methyl methacrylate (MA), and 0.001 parts of n-dodecyl mercaptan (n-DDM) were added. These were rinsed in with a total of 2.31 parts of deionized water. Then 0.023 parts of sodium persulfate (NaPS) dissolved in 1.13 parts of deionized water was added. The reactor was cooled to 35° C. The polymeric emulsion was then filtered.

Examples 20 to 22

Powder blend compositions prepared according to the process in Table 7 wherein the high MW polymer processing aids and/or impact modifiers were provided as water based dispersions are described in Table 8.

These examples show that impact modifiers and/or high MW polymer processing aids can be added in either emulsion or powder form for preparing CVR/CM powder blends. Example 20 is a reference example for comparing results obtained under equivalent conditions adding a high MW polymer processing aid powder. Example 21 demonstrates that the high MW polymer processing aid can be added as an emulsion.

Surprisingly, addition of impact modifiers and/or high MW polymer processing aids provided some unexpected additional advantages in wood flour-PVC blends. In Example 22 addition of both components, while resulting in relatively high moisture contents in the blend (3.09%), gives a high loose bulk density value for the powder (0.487 g/cc), a fast powder blend funnel flow value (12.1 seconds), a high output rate (6.1 kg/hour, presumably due to the improved powder properties) and a very low density foamed product (0.59 g/cc). Finally, edge and surface quality and extrusion performance were good, in spite of the high level of initial moisture that had to be removed from the mix of emulsions added (some 13.40%) during the blending and extrusion steps.

Initial moisture values were based on values for moisture of the wood flour (7.11%), impact modifier moisture (47% for water-based dispersion, 0% for powder) and high MW polymer processing aid moisture (48.4% for water-based dispersion, 0% for powder). Loose bulk density was determined by the number of grams powder occupying a 100 cc graduated cylinder. Funnel flow rate measured the rate of flow of powder through a standard funnel according to ASTM D 1895-96. Final moisture of the powder blends was measured by drying to a constant weight.

Powders prepared according to Examples 20 to 22 were processed into foamed extrudates using a 35 mm KMDL counter-rotating twin screw extruder having a 3-inch wide modified Celuka sheet die, with a three roll stack operating at 35 RPM. The feed set was equal to 6.0, the gap was set using only the top nip and vacuum was set to full at the vent and the sight glass was cracked open on one side. Temperatures of the Screw/Barrel #1/Barrel #2/Die were respectively 175° C./195° C./185° C./185° C. Results of the performance of the extruder and quality and density of the foamed extrudate are provided in Table 8.

In a variation of Example 22, the wood flour was added as step 3 after adding the thermal stabilizer and before adding the high MW polymer processing aid. This resulted in a free-flowing powder composition having a lower moisture content of 1.35%.

Examples 23 to 27

Effect of Order of Addition of Components During Powder Blending

The compositions used in Examples 23 to 27 to test the effect of the order of addition of the components on the properties of the resulting powders and foamed extrudates are listed in Table 9 and component sources are as indicated in Table 8. These powder blends were prepared in a 75 liter Henschel mixer at the conditions listed in Tables 10 and 11.

Each of these powders were processed into foamed extrudates using a KMDL extruder (Krauss-Maffei) operating at 40 RPM, using a 3-inch wide modified Celuka sheet die and a three roll stack. The feed set was equal to 8.5.

TABLE 8

|  | Example 20 | | Example 21 | | Example 22 | |
| --- | --- | --- | --- | --- | --- | --- |
| Components - Product Used | % of total as dried | % of total water | % of total as dried | % of total water | % of total as dried | % of total water |
| PVC Resin - (Geon 110x477, K50) | 42.02 | — | 42.02 | — | 38.76 | — |
| Tin Stabilizer - (Advastab TM-181) | 0.63 | — | 0.63 | — | 0.58 | — |
| Neutral dicarboxylic acid ester of saturated fatty alcohols - (Loxiol G60) | 0.42 | — | 0.42 | — | 0.39 | — |
| Calcium stearate - (Regular)/Witco | 0.63 | — | 0.63 | — | 0.58 | — |
| Paraffin Wax - Hostalub XL-165 | 0.63 | — | 0.63 | — | 0.58 | — |
| Oxidized LDPE Wax - AC629A | 0.13 | — | 0.13 | — | 0.12 | — |
| TOTAL LUBRICANTS | 1.81 | — | 1.81 | — | 1.67 | — |
| High MW Polymer Processing Aid Paraloid K175/Rohm and Haas | 1.26 | — | 1.26 | — | 1.16 | — |
| High MW Polymer Processing Aid - Dry Powder HPPA-P | 6.30 | — | — | — | — | — |
| High MW Polymer Processing Aid - Water-Based Dispersion HPPA-W | — | — | 6.30 | 5.37 | 5.81 | 4.95 |
| TOTAL HIGH MW POLYMER PROCESSING AIDS | 7.56 | — | 7.56 | — | 6.97 | |
| Impact Modifier - Water-Based Dispersion IM-W | — | — | — | — | 7.75 | 5.47 |
| Chemical Blowing Agent - AZO | 0.17 | — | 0.17 | — | 0.16 | — |
| Physical Blowing Agent - Sodium Bicarbonate | 1.18 | — | 1.18 | — | 1.09 | — |

TABLE 8-continued

| Components - Product Used | Example 20 | | Example 21 | | Example 22 | |
|---|---|---|---|---|---|---|
| | % of total as dried | % of total water | % of total as dried | % of total water | % of total as dried | % of total water |
| Calcium carbonate (filler) - Omyacarb UFT | 8.40 | — | 8.40 | — | 7.75 | — |
| Wood Flour, 80 mesh | 38.24 | 2.98 | 38.24 | 2.98 | 35.27 | 2.98 |
| TOTAL COMPONENTS: | 100.00 | 2.98 | 100.00 | 8.35 | 100.00 | 13.40 |
| POWDER RESULTS: | | | | | | |
| Powder Moisture %, after blend processing: | 0.92 | | 0.73 | | 3.09 | |
| Powder Bulk Density (loose, g/cc): | 0.427 | | 0.425 | | 0.487 | |
| Powder Funnel Flow Rate (seconds): | 17.1 | | 15.0 | | 12.1 | |
| FOAM EXTRUDATE RESULTS: | | | | | | |
| Output Rate (lb/hr) | not measured | | 11.4 | | 13.4 | |
| Density (g/cc): | 0.63 | | 0.60 | | 0.59 | |
| Quality: | Good surface and edge | | Good surface and edge | | Good surface and edge | |

Temperatures of the Screw/Barrel #1/Barrel #2/Die were respectively 175° C./195° C./185° C./198° C. An air knife at the die exit blowing away from the die was used to cool the extrudate skin thereby allowing the extrudate to maintain swell thickness. The top roll on the roll stack (chrome) was riding on the top of the sheet to smooth out the surface. No air pressure was used on the chrome rolls to avoid crushing the cell structure. The extrudate was cooled before being pulled by a rubber roll. Results of the powder properties, performance of the extruder, and quality and density of the foamed extrudates are provided in Table 12.

TABLE 9

| Components | Ex. 23 to 25 % | Ex. 26 % | Ex. 27 % of total as dried | Ex. 27 % of total water |
|---|---|---|---|---|
| PVC, K = 50 | 43.59 | 40.92 | 40.92 | — |
| TM-181 | 0.65 | 0.61 | 0.61 | — |
| G60 | 0.44 | 0.41 | 0.41 | — |
| CaSt | 0.44 | 0.41 | 0.41 | — |
| Wax 165 | 0.65 | 0.61 | 0.61 | — |
| AC629A | 0.09 | 0.08 | 0.08 | — |
| TOTAL LUBRICANTS | 1.62 | 1.51 | 1.51 | — |
| K175 | 0.87 | 0.82 | 0.82 | — |
| HPPA-P | 6.54 | 6.14 | 6.14 | — |
| TOTAL HPPAs | 7.41 | 6.96 | 6.96 | — |
| IM-P | — | 6.14 | — | — |
| IM-W (53% solids) | — | — | 6.14 | 5.45 |
| AZO | 0.17 | 0.16 | 0.16 | — |
| Sodium Bicarbonate | 1.22 | 1.15 | 1.15 | — |
| Calcium carbonate | 8.72 | 8.18 | 8.18 | — |
| Wood Flour, 80 mesh | 36.62 | 34.37 | 34.37 | — |
| TOTAL COMPONENTS: | 100.00 | 100.00 | 100.00 | 5.45 |

TABLE 10

| Component - Ex. Order of Addition | Addition Temp., ° C. | Blender Speed | Time, minutes |
|---|---|---|---|
| 23 PVC/BA/Wood Flour | 23 | low | 7 |
| TM181 | 52 | high | 4 |
| Lubricants | 66 | high | 4 |
| High MW Polymer | 77 | high | 7 |

TABLE 10-continued

| Component - Ex. Order of Addition | Addition Temp., ° C. | Blender Speed | Time, minutes |
|---|---|---|---|
| Processing Aids | | | |
| CaCO₃ | 104 | low | 5 |
| ("BA" = blowing agents) | Cool to 77 | Total Time | 27 |
| 24 PVC/BA | 23 | low | 8 |
| TM181 | 52 | high | 8 |
| Wood Flour/Lubricants | 93 | high | 10 |
| | Cool to 61 | | |
| High MW Polymer | 102 | high | 2 |
| Processing Aids | | | |
| CaCO₃ | 104 | low | 3 |
| | Cool to 77 | Total Time | 31 |
| 25 PVC/BA | RT | low | 8 |
| TM181 | 52 | high | 2 |
| Lubricants | 66 | high | 1 |
| High MW Polymer | 77 | high | 3 |
| Processing Aids | | | |
| CaCO₃ | 88 | high | 5 |
| Wood Flour | 91 | high to low | 18 |
| | Cool to 61, Heat to 104 | | |
| | Cool to 77 | Total Time | 37 |

TABLE 11

| Component - Ex. Order of Addition | Addition Temp., ° C. | Blender Speed | Time, minutes |
|---|---|---|---|
| 26 PVC/BA | 23 | low | 6 |
| TM181 | 52 | high | 7 |
| Wood Flour/Lubricants | 93 | high | 10 |
| | Cool to 60 | | |
| High MW Polymer | 102 | high | 3 |
| Processing Aids | | | |
| IM-P | 104 | high | 1 |
| CaCO₃ | 107 | low | 3 |
| | Cool to 77 | Total Time | 30 |
| 27 PVC | RT | low | 4 |
| TM181 | 52 | high | 6 |
| Wood Flour | 93 | high | 1 |
| | Cool to 61 | | |
| IM-W | 66 | low | 2 |
| Lubricants | 74 | high | 15 |
| Blowing Agents | 102 | high | 3 |
| High MW Polymer | 104 | high | 5 |

TABLE 11-continued

| Component - Ex. Order of Addition | Addition Temp., ° C. | Blender Speed | Time, minutes |
|---|---|---|---|
| Processing Aids CaCO₃ | 107 | low | 4 |
| Drop Batch | Cool to 77 | Total Time | 37 |

TABLE 12

| | Results | | | | |
|---|---|---|---|---|---|
| | Ex. 23 | Ex. 24 | Ex. 25 | Ex. 26 | Ex. 27 |
| Powder: | | | | | |
| Loose Powder Bulk Density (g/cc) | 0.443 | 0.431 | 0.43 | 0.442 | 0.459 |
| Funnel Flow (sec) | 16.2 | 20.2 | 28.1 | 15.3 | 15.2 |
| Powder Moisture (%) | 1.18% | 0.92% | 1.58% | 0.73% | 0.82% |
| Processing: | | | | | |
| Pressure, BZ2, kg/cm² | 270.0 | 263 | 360 | 248 | 270 |
| Amps | 4.6 | 4.5 | 4.4 | 5 | 5.4 |
| Vacuum | Slight | Slight | Slight | 3/4 | 3/4 |
| Extrudate: | | | | | |
| Density (g/cc) | 0.581 | 0.559 | 0.598 | 0.524 | 0.558 |
| Surface Quality | 2.0 | 2.0 | 2.0 | 1.5 | 1.5 |
| Edge Quality (1 = Excellent/ 5 = Poor) | 1.5 | 1.5 | 1.5 | 1.5 | 1.5 |
| Rate: kg/Hr | 7.97 | 7.44 | 7.61 | 7.90 | 8.20 |
| m/Hr | 38.1 | 37.9 | 37.3 | 33.7 | 32.9 |

Compared to Examples 23 and 25, Example 24 had the lowest residual powder moisture after blend completion, the lowest extrudate density, and the lowest residence time of wood flour in the blender. Example 24 also shows that adding wood flour with PVC and blowing agents at the beginning of blend cycle results in high loose bulk powder density and fast funnel flow, low extrusion pressures, high output rates, and good extrudate quality.

Example 25 also shows that adding wood at the end of the blend cycle is less desirable for the following reasons: it requires the longest blend times, results in powders having the highest residual powder moisture, powder funnel flow is slower, much higher extrusion pressures result, and foamed extrudate density is higher. Examples 26 and 27 show that adding impact modifier in powder or emulsion form in the same blend sequence as Example 24 results in excellent funnel flow, low residual powder moisture, good extrusion pressures and extrudate densities, good extrudate surface quality, and higher output rates.

Example 28

Coextrusion, Staining, and Thermoforming of a Composite

The compositions of a PVC/WF foam powder blend capstock and a PVC siding substrate are shown in Table 13 for preparing a composite. The PVC/WF powder blend was made according the process in Example 26. The PVC/WF foam blend capstock was coextruded over a typical siding substrate formulation using a 10" wide dual manifold sheet die. A 1.04 mm thick composite sheet was coextruded from a PVC/WF capstock 0.30 mm thick and a PVC substrate 0.74 mm thick. Coverage of the capstock layer was even across the width and quite attractive (wood like appearance). This composite sheet could be used as a vinyl siding product having a wood-like exterior appearance. The composite cut well with either a saw or shears.

The composites could also be stained. A number of samples were cut from the composite. Various stains were applied to the PVC/WF capstock surface which included two exterior oil-based stains (Behr Natural Seal Plus #80 (Santa Ana, Calif.; Flood Penetrating Oil Finish—Type Redwood, Hudson, Ohio), two interior oil-based stains (ZAR #138 and ZAR #116, United Gilsonite Laboratories, Scranton, Pa.), an interior polyurethane gel stain (Mastercraft #MC 16), and an interior water-based stain (Behr #686). The stains were applied with a foam brush and air dried. Visual inspection showed that all of the stains worked well. The water based stain provided the most uniform color and was fastest to absorb. The oil-based and polyurethane-based stains appeared to migrate to specific sites in the composite and imparted a grain type appearance.

The composite sheet could also be thermoformed. Several composite sheets 25 cm×20 cm×1 mm were cut from the extrudate and were readily thermoformed into 3 cm deep rectangular forms using a Model Number 300X Formech (Kings Park, N.Y.) vacuum former. Excellent deep drawn parts were made having no thinning or stress fractures in the capstock. The thermoformed wood composite panels can be used for a number of decorating applications, including interiors of vehicles such as automobiles.

TABLE 13

Compositions of Composite Capstock and Substrate

| | PVC/WF Capstock | | PVC Substrate |
|---|---|---|---|
| Components | phr | % | phr |
| PVC, K = 50 | 100.00 | 40.92 | — |
| PVC, K = 67 | — | — | 100 |
| TM181 | 1.50 | 0.61 | 0.9 |
| G60 | 1.00 | 0.41 | — |
| CaSt | 1.00 | 0.41 | 1.4 |
| Wax 165 | 1.50 | 0.61 | 0.9 |
| AC629A | 0.20 | 0.08 | 0.1 |
| CaCO3, UFT | 20.0 | 8.18 | 10.0 |
| Paraloid ® K175 | 2.00 | 0.82 | — |
| Paraloid ® K400 | 15.0 | 6.14 | — |
| Paraloid ® K-120N | — | — | 0.5 |
| IM-P | — | — | 4.5 |
| IM-W | 15.00 | 6.14 | — |
| AZO | 0.40 | 0.16 | — |
| NaHCO3 | 2.80 | 1.15 | — |
| Wood flour | 84.00 | 34.37 | — |
| TOTAL | 244.40 | 100.00 | 119.3 |

Example 29

Process Using a Cooling Fluid to Augment Expansion of Foamed Extrudate

A PVC/WF powder blend was prepared according to Example 24. A cooling fluid was directed to both the top and underside of the PVC/WF sheet extrudate as it exited the die face. Two 15 cm aluminum air knives (Part Number 2006, Exair Corporation, Cincinnati, Ohio) were used to cool the expanding extrudate. House compressed air supplied at 65 psi was connected to a valve assembly which infinitely controlled the cooling air flow velocity. The air knives were oriented to direct the air away from the die and along the extrudate length. The knives were placed about 5 cm away from the top and bottom surfaces of the extrudate.

The properties of the foamed extrudates prepared with (cooling fluid vs. no cooling fluid) to harden the extrudate surface are as follows: extrudate thickness (6.22 mm vs. 3.81 mm); sheet density (0.552 g/cc vs. 0.655 g/cc).

The extrudate prepared with the cooling fluid was cut and placed within a slightly thinner dimension mold cavity between two chrome plates in a hydraulic press (PHI 100 ton hydraulic press, Pasadena Hydraulics, Inc., City of Industry, Calif.). The cut extrudate was heated in a first press and cooled in a second press at the following conditions (temperature/pressure/time): first 190° C./80 tons/30 seconds, second 25° C./80 tons/90 seconds. The resulting extrudate was stiffer and harder, and exhibited an aesthetically pleasing appearance.

We claim:

1. A process for preparing an extrudable powder blend comprising the steps of:
   (I) blending a mixture comprising the following components:
      (a) from 30 to 65 weight percent of at least one chlorinated vinyl resin;
      (b) from 0.25 to 5 weight percent of at least one thermal stabilizer;
      (c) from 1.5 to 5 weight percent of at least one lubricant;
      (d) from 3.5 to 15 weight percent of at least one high molecular weight polymer processing aid; and
      (e) from 24 to 65 weight percent of at least one cellulosic material containing moisture, based upon the total weight of the powder blend;
   (II) raising the temperature above 50° C. during the (I) blending step; and
   (III) removing water vapor.

2. The process according to claim 1 wherein the total amount of moisture in the extrudable powder blend after step (III) is below three weight percent, based upon the total weight of the powder blend.

3. The process according to claim 2 wherein the (a) at least one chlorinated vinyl resin and the (e) at least one cellulosic material are first blended at a temperature above 80° C. before adding the (c) at least one lubricant.

4. A process for preparing an extrudable free-flowing powder blend comprising the steps of:
   (I) blending a mixture comprising the following components:
      (a) from 40 to 55 weight percent of at least one PVC resin;
      (b) from 0.5 to 1.5 weight percent of at least one thermal stabilizer;
      (c) from 1.5 to 3 weight percent of at least one lubricant;
      (d) from 5 to 10 weight percent of at least one high molecular weight polymer processing aid;
      (e) from 34 to 52 weight percent of at least one wood flour containing moisture;
      (f) from 3 to 15 weight percent of at least one mineral filler; and
      (g) up to 3 weight percent of at least one blowing agent, based upon the total weight of the powder blend;
   (II) raising the temperature above 80° C. during the (I) blending step; and
   (III) removing water vapor so that the final moisture amount in of the powder blend is below 2.0 weight percent, based upon the total weight of the powder blend.

5. The process according to claim 4 wherein the (a) at least one PVC resin and the (e) at least one wood flour are first blended at a temperature above 80° C. before adding the (c) at least one lubricant.

6. The process according to claim 4 wherein the final moisture content is below one weight percent, based upon the total weight of the powder blend.

7. The process according to claim 4 wherein the mixture further comprises up to 15 weight percent of at least one impact modifier, based upon the total weight of the powder blend.

8. The process according to claim 4 wherein the total amount of water added during the addition of components (a) through (f) is less than or equal to 25 weight percent, based upon the total weight of the powder blend.

9. The process according to claim 8 wherein at least one of the components (a) through (f) is supplied as a water-based dispersion.

10. A process for preparing a foamed extrudate comprising the steps of:
    (I) feeding an extrudable free-flowing powder blend, comprising at least one chlorinated vinyl resin, at least one blowing agent, and from 24 to 65 weight percent of at least one cellulosic material containing moisture, based upon the total weight of the powder blend, into an extruder;
    (II) melting the powder blend to form a melt;
    (III) extruding the melt from a die to form an expanding extrudate having at least one surface; and
    (IV) hardening the surface of the expanding extrudate with a cooling fluid to increase the expansion ratio.

11. The process according to claim 10 wherein the cooling fluid is a gas directed away from the die surface and towards the surface of the extrudate.

* * * * *